INVENTOR
FUMIO SATO

United States Patent Office 3,426,706
Patented Feb. 11, 1969

3,426,706
METHOD OF COUNTING AND TURNING FLAT BODIES
Fumio Sato, Koza-gun, Japan, assignor to Morinaga Confectionery Company Ltd., Tokyo, Japan
Filed Aug. 21, 1967, Ser. No. 662,038
Claims priority, application Japan, Sept. 14, 1966, 41/60,339
U.S. Cl. 107—45
Int. Cl. A21c 9/00; B65g 47/26
4 Claims

ABSTRACT OF THE DISCLOSURE

A method of simultaneously counting and turning flat bodies moving in a plurality of parallel lines with the flat bodies in the lines being face to face against each other, said method comprising the steps of moving a group of a preselected number of flat bodies from each of said lines transversely of the lines, and while maintaining the bodies in each group in face to face relationship, moving the bodies linearly in a direction transverse to the plane of the faces of the bodies while blocking one edge of the bodies in the group, thereby turning the group of bodies while maintaining them in face to face relationship, continuing to so move them until they have turned 90 degrees, and thereafter moving the groups of turned bodies along converging paths until the groups abut each other to form a continuous transverse line of flat bodies.

---

The present invention relates to a new and improved method of counting and turning a series of flat bodies.

Heretofore, packing baked products like biscuits in a carton has been carried out entirely by manual work with no machinery being used to count a given number of such baked products as they emerge from a band oven and get them ready for packing. But such manual counting and packing fatigues the workers, and is often unsanitary and unfavorable from the viewpoint of labor efficiency.

It has now been discovered that there is a way of simultaneously counting and turning baked products like biscuits emerging continuously in columns from a band oven so that a given number of such products are rearranged in a transverse row ready for packing in a carton.

Figure 1:
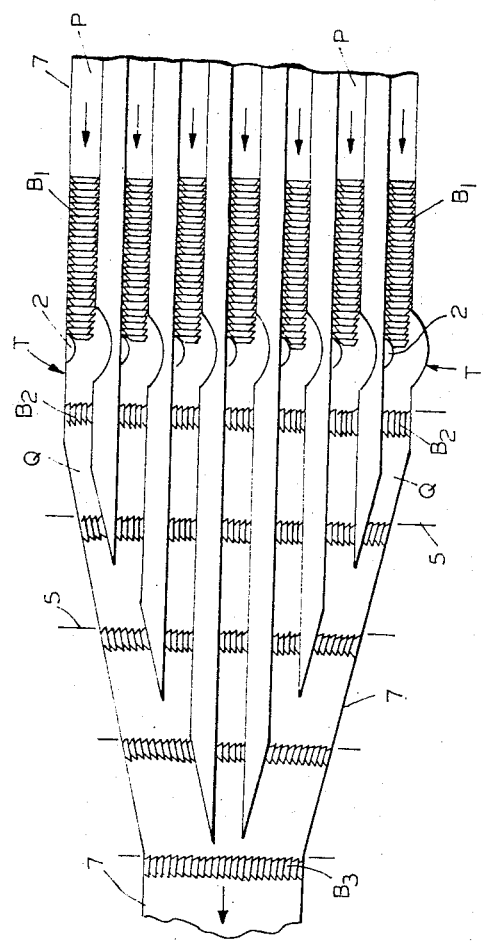

A mechanical system representing a preferred embodiment of the invention will now be described in conjunction with the accompanying drawings in which:

FIG. 1 is the plan view of a counting and turning system according to the invention; and FIGS. 2A through 7B illustrate the several steps by which such counting and turning is achieved; in each pair of figures, the figures designated A shows said system in plan view and that designated B shows the system in elevation.

In FIG. 1, which shows the general operation of said system, columns B1 of biscuits are moving in the direction of the arrows after having been baked in a band oven. As illustrated, each column of biscuits B1, which are positioned face to face with each other, proceeds horizontally between a pair of parallel spaced side walls 7 in a path P. At the end of said path, the biscuits in column B1 are lifted and shifted to another similar path Q, also having parallel side walls, and at the beginning of which there is a turning section T having a protrusion 2 on the inside of one of the said walls thereof, a mover, and other elements to be described hereinafter. A given number of biscuits is counted at the end of each of the columns B1 (seven such columns are illustrated) and this group of biscuits is turned horizontally through 90 degrees in this section, becoming biscuit groups B2 arranged so as to be parallel to the length of path Q, as illustrated. The groups B2 are moved along path Q by a cross rod 5, and finally join each other to form a single row of biscuits B3 ready for automatic packing in a carton.

Now, with respect to each column B1, the way in which biscuits are turned 90 degrees is described in detail below in conjunction with FIGS. 2A through 7B.

Figure 2A:
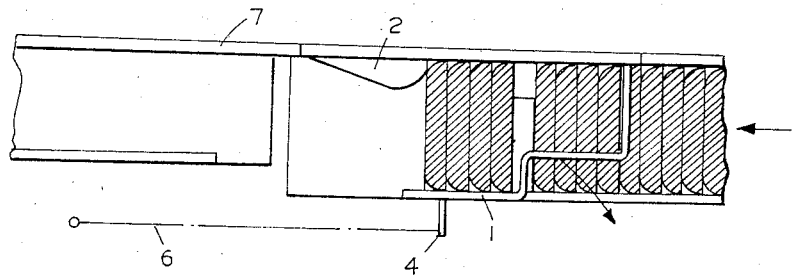
Figure 2B:
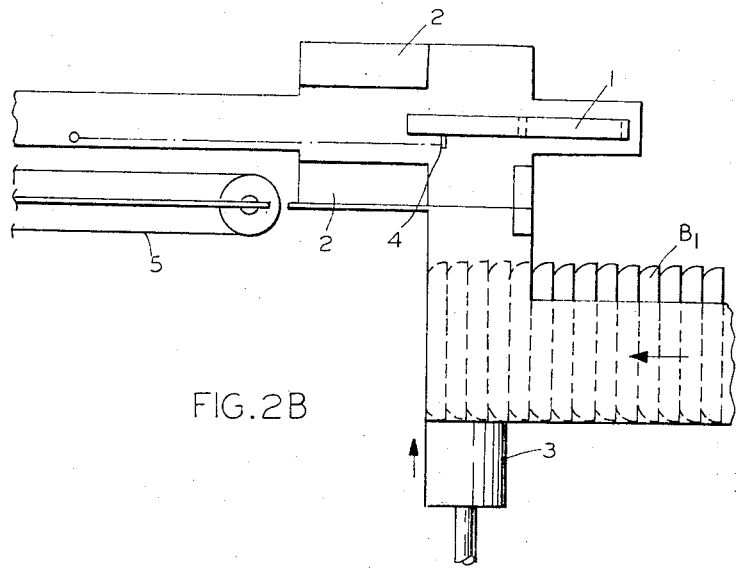

In the figures designated A, the shaded pieces represent biscuits in the path P and the unshaded ones, those which have been lifted and placed in the new path Q. As shown in FIGS. 2A and 2B, a given number of biscuits from a column B1 moving in the path P in the direction of the arrow, move onto a lifter 3 at the end of the path P.

Figure 3A:
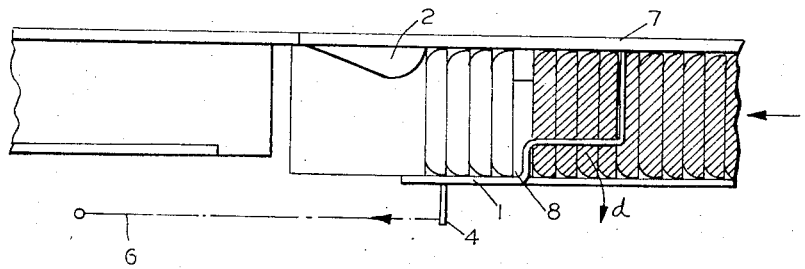
Figure 3B:
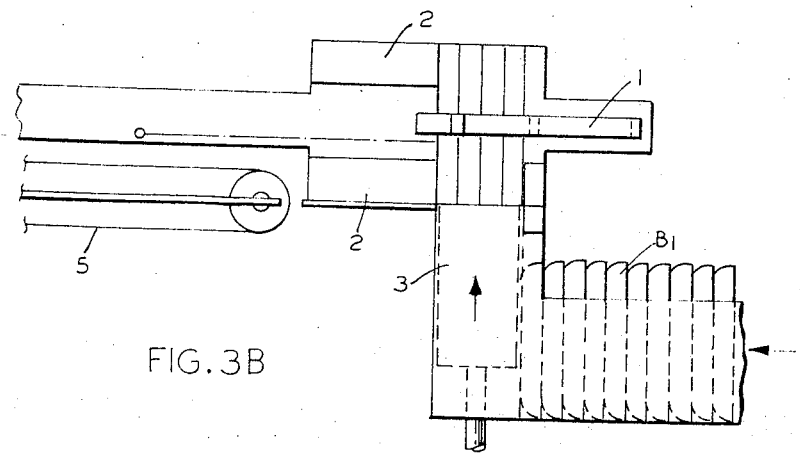
Figure 4A:
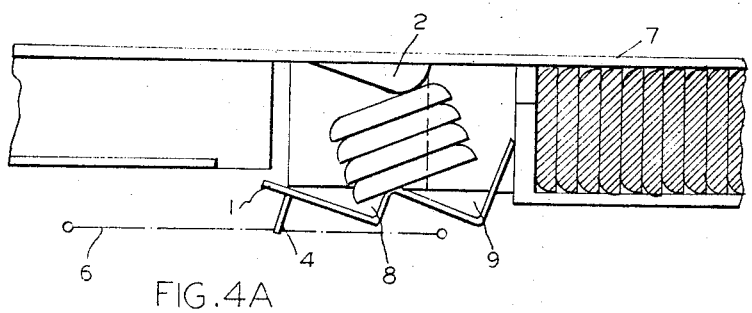
Figure 4B:
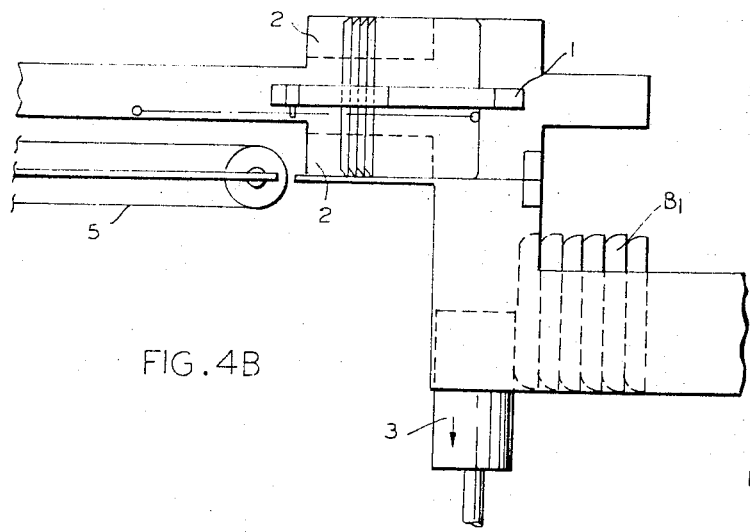

As soon as the biscuits move onto the lifter 3, the lifter is raised and stops at the level shown in FIG. 3B.

In the position shown in FIGS. 3A and 3B, the biscuits, still face to face with each other, are engaged by a mover 1 located on one side of the path Q. The mover 1 is double-L shaped, and can turn a little in the direction of the arrow A against the pressure of a spring (not shown) around a fulcrum 4 located outside the side wall 7. The angle through which the mover turns is just enough to permit the biscuits to turn 90 degrees, and usually is less than 20 degrees.

The biscuits in the position shown in FIG. 3A are engaged by the first L-section 8 of the mover 1, which is moved by moving the fulcrum 4 in the direction of the arrow b along the broken line 6.

Because side wall 7 of the path Q has the protrusion 2 thereon, as the biscuits begin to be pushed forward by the first L-section 8 of the mover 1, one side of the biscuits is blocked by said protrusion 2. Since the mover continues to move ahead as the fulcrum 4 moves, the mover turns about 20 degrees while pressing against the biscuits.

Figure 5A:
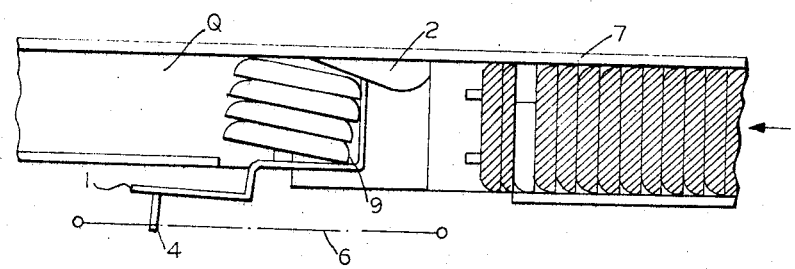
Figure 5B:
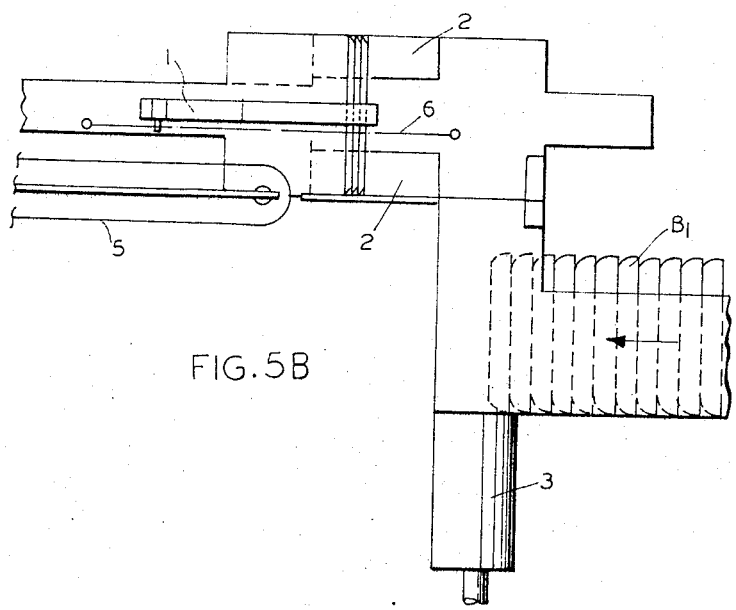

The biscuits, while staying arranged face to face with each other, are moved around and along the protrusion 2 and are thus compelled to turn (see FIGS. 4A and 4B) until they fit into and are engaged by the second L-section of the mover 1 (see FIGS. 5A and 5B).

On the opposite side of the path Q from the sidewall protrusion 2, enough room is provided to permit the rotation of the mover 1. Therefore, after the biscuits have been engaged by the second L-section 9 of the mover 1, the mover 1 is turned back by the action of the spring (not shown) from the position shown in FIG. 4A through the position in FIG. 5A to the position in FIG. 6A. Then the mover 1 leaves the biscuits in the path Q and begins to withdraw.

Figure 6A:
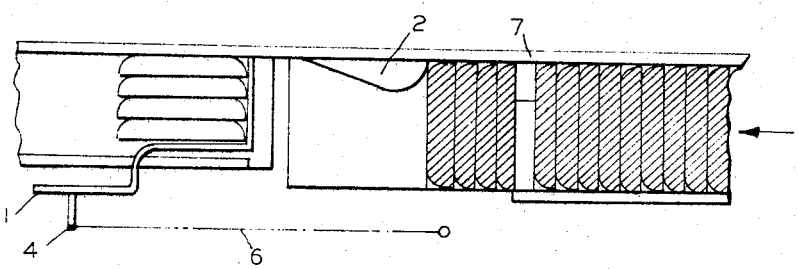

The biscuits which have been turned horizontally 90 degrees in each path Q, as shown in FIG. 6A form a broken row B2 with the other groups of biscuits in the adjacent paths. These groups come closer and closer to each other as they are moved along the paths Q by a cross rod 5, which is driven forward by an endless belt 5′ (see FIGS. 7A and 7B) until they form a single row B3, as shown in FIG. 1, ready for packing in a carton.

Figure 6B:
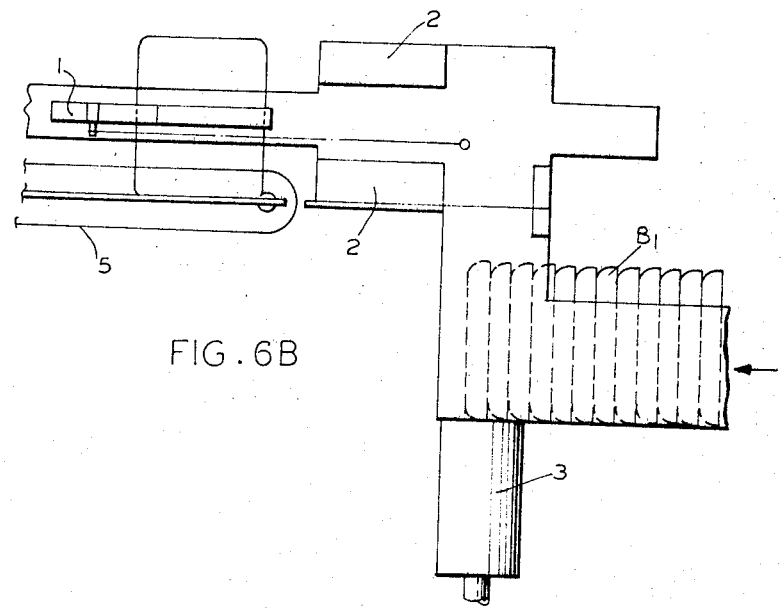
Figure 7A:
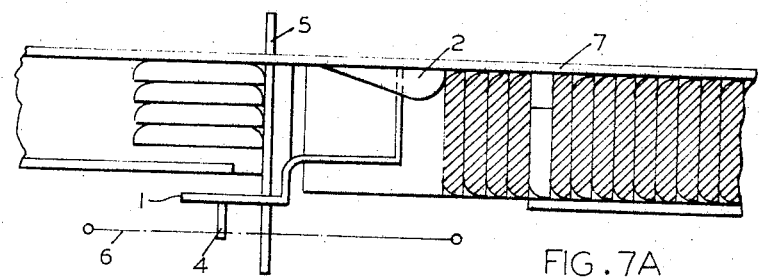
Figure 7B:
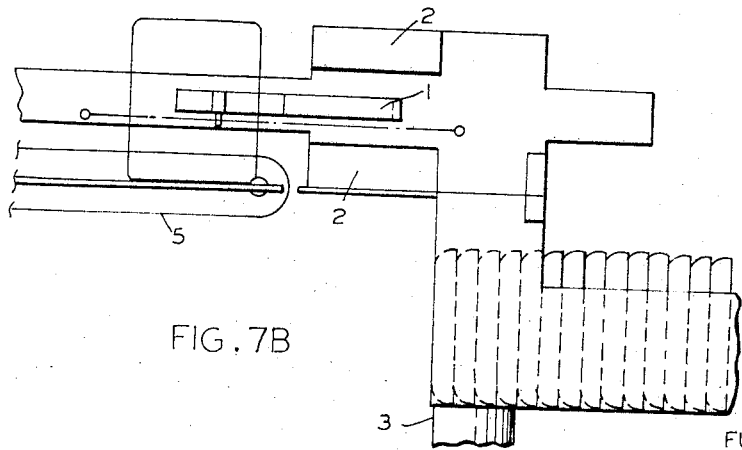

The lifter 3, shown in FIG. 3B, having lifted the first group of biscuits, starts downward as soon as the biscuits begin to be turned (see FIG. 4B), and stops at the level where its top is level with the path P, ready to accept the next group of biscuits (see FIGS. 5B and FIG. 6B).

As soon as the lifter 3 is loaded with the second group consisting of the same number of biscuits as were in the first group (see FIG. 7B), the lifter starts upward, again lifting them to the path Q as shown in FIG. 1 and FIG. 2B.

Due to the above described construction, the baked biscuit counting and turning system of the present invention has a special advantage due to the use of a mover 1 which enables pieces of fragile biscuit or cake to be rearranged into equal groups automatically and without damage preparatory to packing in cratons.

Although the present invention has been described in the above with reference to baked biscuits or cake alone, it is to be understood that this invention is also applicable to the counting and turning of relatively flat pieces of other industrial products discharged continuously from a process.

What is claimed is:

1. A method of simultaneously counting and turning flat bodies moving in a plurality of parallel lines with the flat bodies in the lines being face to face against each other, said method comprising the steps of moving a group of a preselected number of flat bodies from each of said lines transversely of the lines, and while maintaining the bodies in each group in face to face relaitonship, moving the bodies linearly in a direction transverse to the plane of the faces of the bodies while blocking one edge of the bodies in the group, thereby turning the group of bodies while maintaining them in face to face relationship, continuing to so move them until they have turned 90 degrees, and thereafter moving the groups of turned bodies along converging paths until the groups abut each other to form a continuous transverse line of flat bodies.

2. An apparatus for simultaneously counting and turning bodies moving in a plurality of parallel lines with the flat bodies in the lines being face to face against each other, said apparatus comprising a plurality of spaced parallel first paths each defined by a pair of parallel walls between which the flat bodies are guided in the parallel lines, a lifter at the end of each first path movable transversely of the first path for moving a group of flat bodies transversely to said first path while maintaining the bodies in the face to face relationship, a plurality of spaced second paths each having an end at the end of the path of movement of a lifter, said second paths each being defined by a pair of spaced parallel walls between which the flat bodies are guided, said second paths converging at the ends remote from the lifters, one wall of each of the second paths having a projection thereon adjacent the lifter, movers reciprocally movable along the second paths from a position on the other side of the lifters from the projections and toward the projections and pivotable away from the projections for engaging the groups of flat bodies on the lifters and moving them toward the projections and turning them around the projections 90 degrees, and means for engaging the turned groups of flat bodies and moving them along the second paths.

3. An apparatus as claimed in claim 2 in which said movers each comprise a double L-shaped member engagable with the flat bodies, and a fulcrum moving means moving a fulcrum reciprocally along said second path, one end of the double L-shaped member being mounted on said fulcrum.

4. An apparatus as claimed in claim 2 in which said means for engaging and moving the turned groups of flat bodies comprises a rod extending across all of the second paths, the walls defining the second paths being less in traverse dimension than the corresponding dimension of the flat bodies.

References Cited

UNITED STATES PATENTS 3,139,714  7/1964  Hall _____ 53—159

FOREIGN PATENTS 10,965  2/1916  Great Britain.
217,955  11/1961  Austria.
942,187  11/1963  Great Britain.

WALTER A. SCHEEL, *Primary Examiner.*

A. O. HENDERSON, *Assistant Examiner.*

U.S. Cl. X.R.

198—32